UNITED STATES PATENT OFFICE.

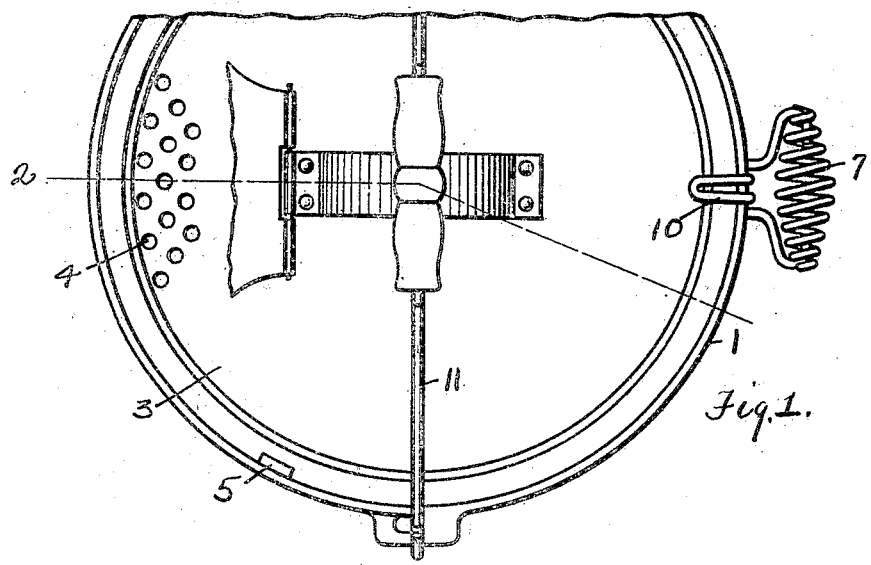
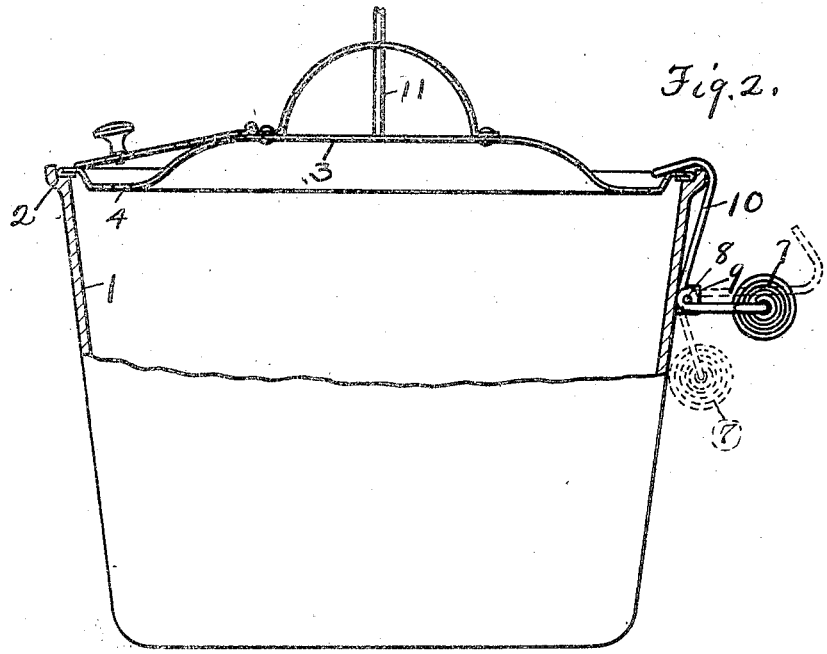

JOHN C. HOLLANDS, OF ERIE, PENNSYLVANIA, ASSIGNOR TO GRISWOLD MANUFACTURING COMPANY, OF ERIE, PENNSYLVANIA, A CORPORATION OF PENNSYLVANIA.

KETTLE.

1,377,684.        Specification of Letters Patent.        Patented May 10, 1921.

Application filed March 10, 1919. Serial No. 281,674.

*To all whom it may concern:*

Be it known that I, JOHN C. HOLLANDS, a citizen of the United States, residing at Erie, in the county of Erie and State of Pennsylvania, have invented new and useful Improvements in Kettles, of which the following is a specification.

This invention relates to kettles and consists in certain improvements in the construction thereof as will be hereinafter fully described and pointed out in the claims.

With some types of kettles it is desirable to have the cover so arranged that the cover may be held in place as the kettle is tilted so as to drain the kettle. The object of the present invention is to make the cover-holding means more certain for this purpose.

The invention is illustrated in the accompanying drawings as follows:—

Figure 1 shows a plan view of the kettle.

Fig. 2 a side elevation, partly in section, on the line 2—2 in Fig. 1.

1 marks the kettle, 2 a cover seat around the top of the kettle, 3 a cover arranged in the seat, 4 perforations in the cover, and 5 lugs extending from the edge of the kettle over the cover, there being a companion lug to the lug 5 shown in Fig. 1 directly opposite the lug 5 as is common. The parts so far described have been heretofore made and the lugs 5 under most conditions hold the cover in place but a more certain holding of the cover is desirable. In order to accomplish this I have provided the following mechanism:—

A handle 7 is pivotally mounted on a pin 8 carried by the lugs 9 extending from the side of the kettle. A hook 10 extends from the handle and is so shaped as to extend over the edge of the kettle and over the edge of the cover when the handle is withdrawn to the operative position shown in the drawings. When the handle 7 is released it drops by gravity to the side of the kettle and this carries the hook which is integral with the handle out of locking position on the cover so that the cover may be readily removed.

In operation the kettle is usually taken by the bail 11, the handle 7 grasped and the mere operation of the handle in the tilting operation automatically puts the hook in place. By this means all danger of displacement of the cover is obviated.

What I claim as new is:—

The combination of a kettle having a cover seat thereon and lugs projecting over the seat; a cover mounted on the seat and under the lugs, said cover having a strainer portion; a handle mounted on the kettle; and a locking member retaining the cover in the seat under the lugs actuated by the handle and moved into locking position on the cover as the handle is actuated.

In testimony whereof I have hereunto set my hand.

JOHN C. HOLLANDS.